(12) United States Patent
Mudalige

(10) Patent No.: US 8,019,533 B2
(45) Date of Patent: Sep. 13, 2011

(54) SYSTEM AND METHOD FOR DATA COMMUNICATION BETWEEN A VEHICLE AND AN INFRASTRUCTURE

(75) Inventor: Upali Priyantha Mudalige, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 575 days.

(21) Appl. No.: 12/209,224

(22) Filed: Sep. 12, 2008

(65) Prior Publication Data

US 2010/0070167 A1    Mar. 18, 2010

(51) Int. Cl.
    *G01C 21/00* (2006.01)
(52) U.S. Cl. ......... 701/200; 701/201; 455/517; 370/328
(58) Field of Classification Search .................. 701/200, 701/201; 455/517; 370/328
    See application file for complete search history.

(56) References Cited

U.S. PATENT DOCUMENTS

| 2003/0214582 A1* | 11/2003 | Takahashi et al. ............ 348/116 |
| 2008/0082255 A1* | 4/2008  | Takahata et al. .............. 701/201 |
| 2009/0167513 A1* | 7/2009  | Hill et al. ...................... 340/435 |
| 2011/0106337 A1* | 5/2011  | Patel et al. ........................ 701/2 |

\* cited by examiner

*Primary Examiner* — Mark Hellner

(57) ABSTRACT

A method is provided of transferring a data unit between a vehicle and an infrastructure communication network. The inter-vehicle communication network includes a plurality of roadside communication devices for relaying data to and from a vehicle traveling along a navigation route. At least a portion of the navigation route the vehicle is traversing is determined. The expected roadside communication devices disposed along the navigation route are identified. A respective time period that the vehicle will be within a transmitting range of each respective roadside communication device along the navigation route is estimated. The data message is segregated into sub-units of data. The amount of data contained in a respective sub-unit is based on an amount of data that may be communicated between the vehicle and a respective roadside communication device during the respective time period that the vehicle is within the transmitting range of the respective roadside communication device.

20 Claims, 3 Drawing Sheets

SYSTEM AND METHOD FOR DATA COMMUNICATION BETWEEN A VEHICLE AND AN INFRASTRUCTURE

BACKGROUND OF INVENTION

The invention relates generally to V2I and I2V communications and the segregation and transmitting of a data message between the vehicle and the infrastructure.

Vehicle-to-infrastructure (V2I) and infrastructure-to-vehicle (I2V) communications are co-operative systems based on two-way communications for interacting in real time. These systems are preferably directed at the communication of both non-safety and safety applications for transportation vehicles. There are V2I and I2V applications that transfer large amounts of data between the infrastructure and the vehicle using roadside equipment (RSE) or access points (AP). However, dependent up the size of the data contained in the file or data message to be transferred, it may not be possible to transfer the entire contents of the intended file from/to a single RSE or AP given the RSE or AP only has limited transmission range resulting in a limited time window to transmit the file or data message to/from a moving vehicle.

SUMMARY OF INVENTION

An advantage of an embodiment is the efficient transmission of data between a vehicle and an infrastructure network along a determined navigation route by transmitting a plurality of sub-units of data at a plurality of data transmission regions whenever the data unit as a whole would be too large to transmit during the time the recipient is in range. Another advantage of an embodiment of the invention is the dynamical change in the scheme of the data message transmission taking into account traffic conditions affecting the travel speed of the vehicle in transit (and thus the clock time that the vehicle will be in range of respective roadside communication devices).

An embodiment contemplates a method of transferring a data unit between a vehicle and an infrastructure communication network. The vehicle communication network includes a plurality of roadside communication devices for relaying data to and from a vehicle traveling along a navigation route. At least a portion of the navigation route the vehicle is traversing is determined. The expected roadside communication devices disposed along the navigation route are identified. A respective time period that the vehicle will be within a transmitting range of each respective roadside communication device along the navigation route is estimated.

The data in each sub-unit is relayed between the vehicle and a respective roadside communication device. The amount of data contained in a respective sub-unit is based on an amount of data that may be communicated between the vehicle and a respective roadside communication device during the respective time period that the vehicle is within the wireless transmission range of the respective roadside communication device.

An embodiment contemplates a vehicle communication system for transferring a data message between a vehicle and an infrastructure communication network. A navigation device determines a navigation route the vehicle is traversing. A plurality of expected roadside communication devices relay the data message to the vehicle traveling along a navigation route. An application data server controls the data message (size and transmission time) transmitted by the roadside communication devices. The plurality of expected roadside communication devices are identified along the navigation route. A respective time period that the vehicle will be within a transmission range of each respective roadside communication device along the navigation route is estimated. The data message is segregated into sub-units of data. Each sub-unit of data is relayed between a respective roadside communication device and the vehicle. A quantity of data contained in a respective sub-unit is based on an amount of data that may be communicated between the vehicle and the respective roadside communication device during the respective time period that the vehicle is within the transmission range of the respective roadside communication device.

DETAILED DESCRIPTION

Figure 1:
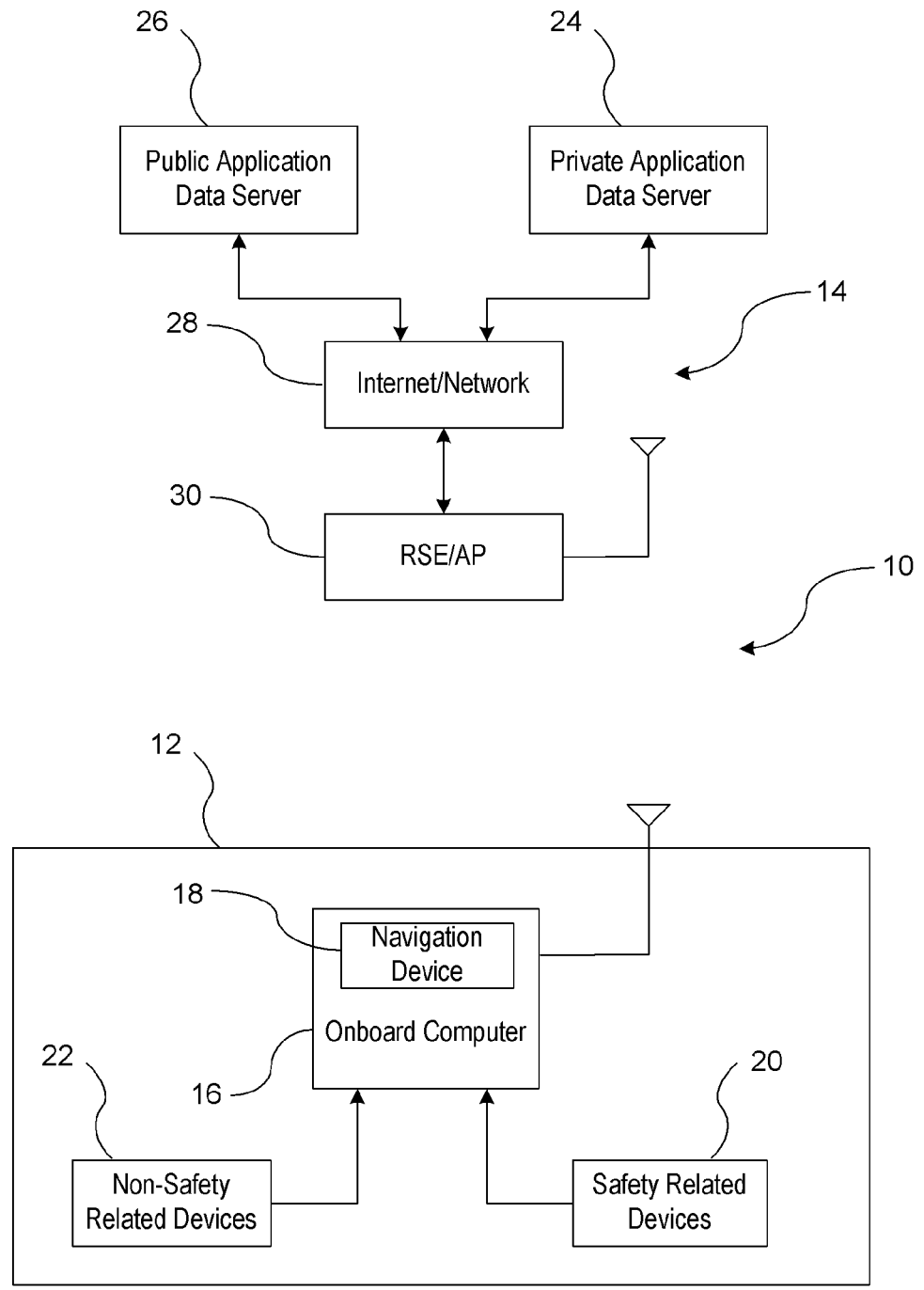
FIG. 1 is a is block diagram of the vehicle-infrastructure communication system

There is shown in FIG. 1 a vehicle communication system 10 for transferring a data message between a vehicle 12 and an infrastructure communication network 14. The vehicle 12 includes an on-board computer. The on-board computer 16 may be used to communicate data messages between the vehicle 12 and the infrastructure communication network 14. The on-board computer 16 includes a navigation device 18. The navigation device may be used to determine a navigation route based on a destination input by the vehicle driver and the current location of the vehicle. The on-board computer 16 includes a transmitter and receiver or like for receiving and transmitting data messages and files. Such applications utilizing data transfer include, but are not limited to, map downloading, audio/video data sharing, file transfers, social networking, and V2X communications. The vehicle may further include safety related devices 20 and non-safety related devices 22 coupled to the on-board computer 16 for processing safety and non-safety related data that is transmitted to and from the vehicle 12.

The infrastructure communication network 14 includes application data servers such as, but not limited to, a private application data server 24 and/or a public application data server 26. The application data servers are coupled to a network or internet 28 for wirelessly linking the respective application data servers and the vehicle 12. The infrastructure communication network 14 further includes a plurality of roadside communication devices 30. The roadside communication devices 30 function as wireless access points which relay data between the vehicle 12 and wired devices in the infrastructure communication network 14. Each roadside communication device 30 is disposed at various locations along vehicle roads. Each respective communication device receives and transmits data messages within a respective transmission range (hereinafter referred to as a transmission region).

Figure 2:
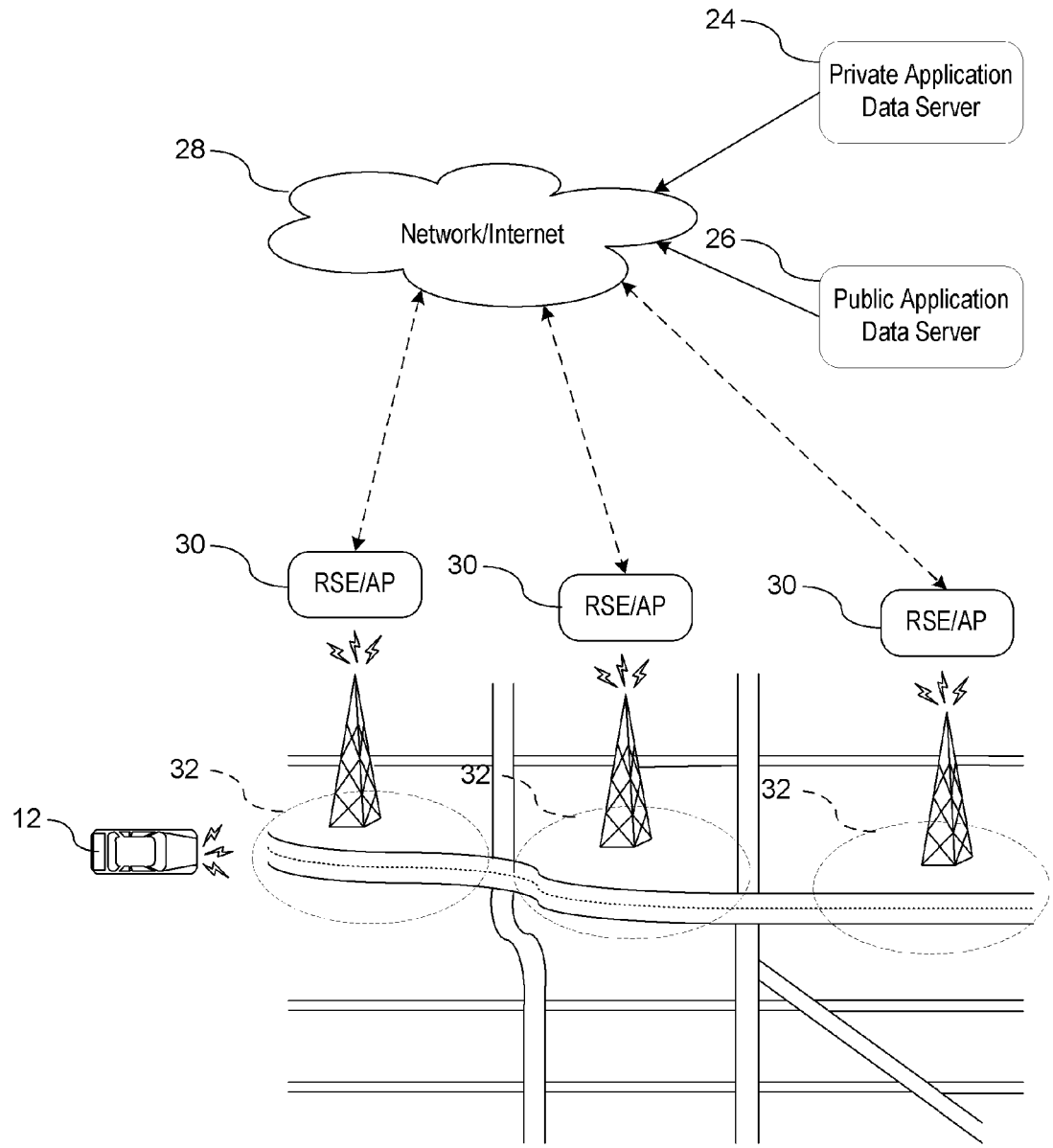
FIG. 2 is a communication network along a navigation route

FIG. 2 illustrates a communication network disposed along a navigation route. The navigation route in which the vehicle 12 is traveling is determined by either the on-board navigation device or by an off-board navigation device in response to a driver informed destination. Once the navigation route is determined, expected roadside communication devices 30 disposed along the determined navigation route are identified. Each of the expected roadside communication devices 30 disposed along the determined navigation route is in communication with application data servers 24, 26 via the network/internet 28. Each respective roadside communication device 30 receives and transmits messages within a respective transmission region generally identified by 32. The application data servers 24, 26 determine which expected roadside communication devices disposed along the will be used to transmit the segregated data message.

When the vehicle 12 is within a respective transmission region 32, the vehicle 12 is capable of receiving or transmitting data messages to the respective roadside communication devices 30. As a result, a data message may be communicated to a vehicle if the time (e.g., time-of-day or countdown) and the length of time are known when the vehicle will be in the respective transmission region 32 of a respective roadside communication device 30. Moreover, if the data message is too large to be communicated within a respective transmission region 32 of a respective roadside communication device 30, the message may be segregated into sub-units of data where the sub-units of data are transmitted by two or more roadside communication devices 30 disposed along the navigation route. If the application data servers 24, 26 are determining which expected roadside communication devices are to be used, then the application data servers 24, 26 may also determine the estimated time of arrival of the vehicle 12 at each of the expected roadside communication devices 30 in addition to the amount of data transmitted within a respective transmission region 32. Various factors are taken into consideration for projecting the arrival time at respective transmission region, including but not limited to, true vehicle speed, dynamic traffic congestion information, the traffic signal information, speed limits, vehicle position, monitored traffic flow speeds, and vehicle stoppage. Based on the above information, the estimated time of arrival at each respective roadside communication device 30 in addition to the length of time that the vehicle 12 will be within a transmission region of a respective roadside communication device 30 may be determined. The determination of when the vehicle 12 will arrive at each transmission region 32 in addition to length of time the vehicle 12 is traveling within the transmission region 32 of each roadside transmission device 30 is dynamic and may be modified based on a change in one of the monitored conditions described above.

The amount of data that may be contained within a respective sub-unit of data for a respective transmission region may be determined by the following formula:

$$S_i = (R_i D_i / V_i)$$

where $S_i$ is a size of data for a respective sub-unit, $R_i$ is a wireless link data rate, $D_i$ is a length of the path of travel within a maximum reception distance or an assigned coverage area for a respective roadside communication device along the navigation route, and $V_i$ is the average vehicle speed while traversing $D_i$.

Figure 3:
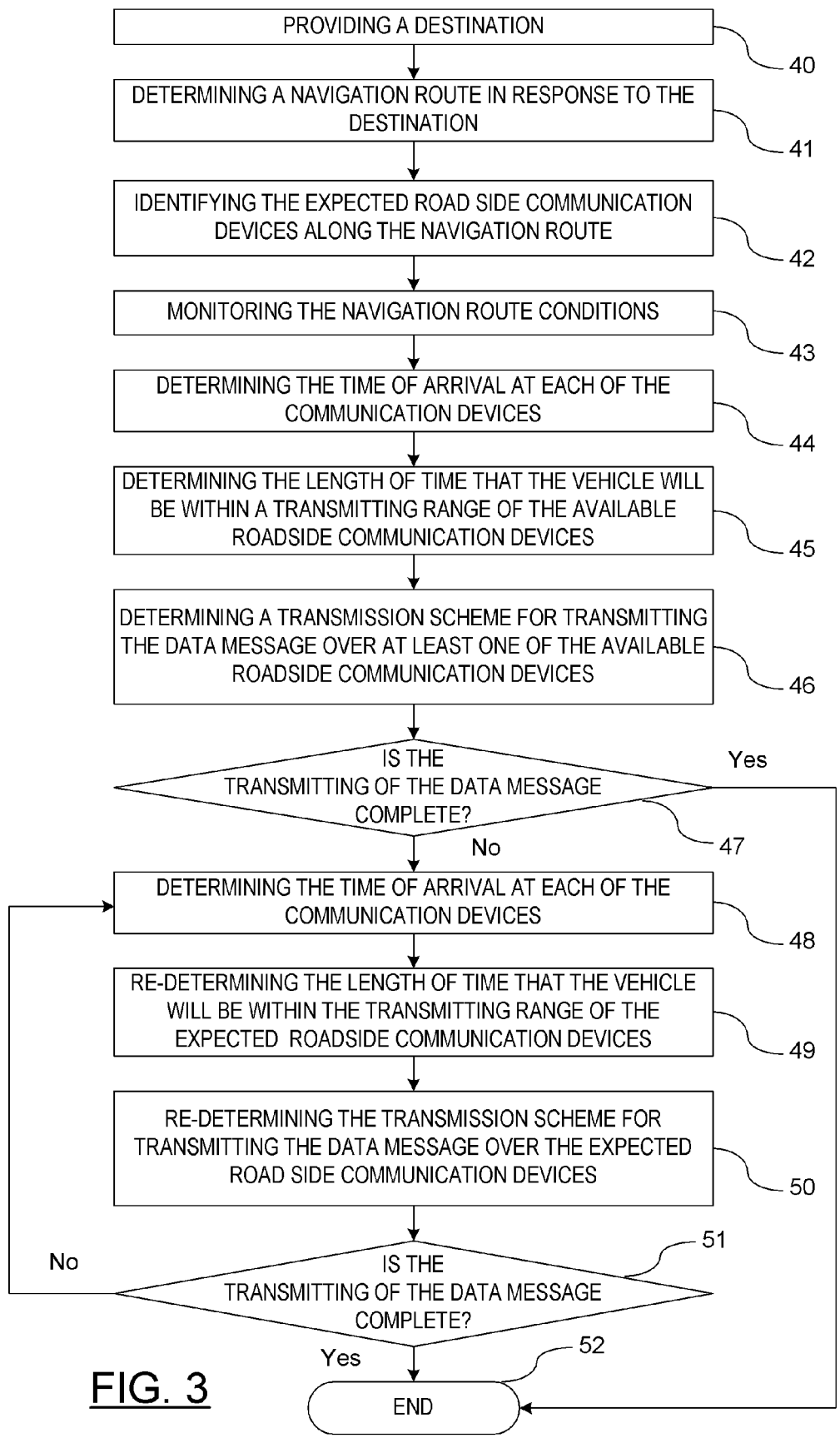
FIG. 3 is a method of determining a transmission scheme for a respective data message in a vehicle-infrastructure network.

FIG. 3 illustrates a method of determining a transmission scheme for a respective data message transmitted between an application data server and a vehicle.

In step 40, a destination is provided by a user of the vehicle. The destination may include a destination address, point of interest, or other location identifying the destination.

In step 41, a navigation route is determined in response to the destination input by the user. The navigation route may be determined by the on-board navigation device within the vehicle taking into consideration the current location of the vehicle as indicated by a GPS and the destination entered by the user. Alternatively, the destination may be transmitted to an off-board navigation device for determining the navigation route.

In step 42, the expected roadside communication devices are identified along the determined navigation route. As described earlier, the roadside communication devices are wireless access points where data may be exchanged with a vehicle while the vehicle is within a respective transmission region of a respective roadside communication device.

In step 43, vehicle operating conditions and traffic conditions are monitored while traveling along the determined navigation route. Such conditions include, but are not limited to, the true vehicle speed, dynamic traffic congestion information, the traffic signal information, speed limits, vehicle position, monitored traffic flow speeds, and other conditions.

In step 44, the arrival time at each of the expected roadside communication devices disposed along the navigation route are determined in response to the monitored vehicle operating conditions and traffic conditions.

In step 45, a respective length of time that the vehicle will be within a transmission region for each roadside communication device is determined. Based on the vehicle speed and other monitored conditions, a respective length of time is determined identifying the length of time that the vehicle will be traveling within the respective transmission region of each roadside communication device.

In step 46, a message transmission scheme is determined for transmitting the data message over at least one of the expected roadside communication devices in response to the determined arrival time at each expected roadside communication device and the length of time the vehicle will be within the transmission region of each roadside communication device. That is, given the determined arrival time and length of travel time within the respective transmission ranges as described in step 46, the data message is segregated into two or more sub-units where the amount of data contained in a respective sub-unit is based on an amount of data that may be communicated between the vehicle and a respective roadside communication device during the respective time period that the vehicle is within the transmission region of the respective roadside communication device.

In step 47, a determination is made as to whether the transmitting of the data message as a whole is complete. If the transmitting of the data message is complete, then the routine proceeds to step 52 where the routine is terminated. If the transmitting of the data message in not complete, then the routine proceeds to step 48.

In step 48, the vehicle transit conditions as described earlier are monitored. Based on the monitored conditions as described earlier, if the a respective condition changes which ultimately affects the arrival times for one or more expected roadside communication devices, then the arrival times at each of the expected roadside communication devices are re-determined in step 48. The routine then proceeds to step 49.

In step 49, the length of travel time through each transmission range is re-determined for the remaining expected roadside communication devices.

In step 50, the transmission scheme for the remaining expected roadside communication devices are re-determined based on the changes to the arrival times and travel time through each expected transmission range.

In step 51, a determination is made as to whether the transmitting of the data message as a whole is complete. If the transmitting of the data message is complete, then the routine proceeds to step 52 where the routine is terminated. If the transmitting of the data message in not complete, then the routine returns to step 48 to determine if any conditions have changed for re-determining the transmission scheme.

It should be noted that the transmission scheme applies to transmitting data messages from the roadside communication devices to the vehicles as well as transmitting data messages from the vehicle to the roadside communication devices.

Furthermore, it is noted that the determination of the arrival times, length of travel time through each transmission region, the amount of data transmitted at each transmission region, and the transmission scheme may be determined by an-board navigation device or an off-board navigation device. If the determination of the above conditions is by an on-board navigation device, then the on-board navigation device may transmit the transmission scheme and schedule to the respective application data servers for identifying the amount of data and the time when each expected roadside communication device should transmit a respective sub-unit of data.

While certain embodiments of the present invention have been described in detail, those familiar with the art to which this invention relates will recognize various alternative designs and embodiments for practicing the invention as defined by the following claims.

What is claimed is:

1. A method of transferring a data unit between a vehicle and an infrastructure communication network, the inter-vehicle communication network including a plurality of roadside communication devices for relaying data to and from a vehicle traveling along a navigation route, the method comprising the steps of:
   determining at least a portion of the navigation route the vehicle is traversing;
   identifying expected roadside communication devices disposed along the navigation route;
   estimating a respective time period that the vehicle will be within a transmitting range of each respective roadside communication device along the navigation route; and
   segregating the data message into sub-units of data, each sub-unit to be relayed between the vehicle and a respective roadside communication device, wherein the amount of data contained in a respective sub-unit is based on an amount of data that may be communicated between the vehicle and a respective roadside communication device during the respective time period that the vehicle is within the transmitting range of the respective roadside communication device.

2. The method of claim 1 wherein the respective roadside communication devices are in communication with an application data server for wirelessly transferring the segregated data message from the application data server to the vehicle.

3. The method of claim 2 wherein an off-board navigation system determines the vehicle navigation route in response to a driver identified destination.

4. The method of claim 3 wherein the application data server receives the vehicle navigation route and determines which expected roadside communication devices disposed along the navigation route will be used to transmit the segregated data message.

5. The method of claim 4 wherein the application data server determines an estimated time of arrival of the vehicle at each expected roadside communication device in response of the navigation route.

6. The method of claim 5 wherein the application data server determines a sub-unit size and estimated time of message data transfer at each respective roadside communication device.

7. The method of claim 2 wherein an on-board vehicle navigation program determines the navigation route in response to a driver identified destination.

8. The method of claim 7 wherein the on-board vehicle navigation system determines which expected roadside communication devices disposed along the navigation route will be used to transmit the segregated data message.

9. The method of claim 8 wherein the on-board navigation device determines an estimated time of arrival of the vehicle at each expected roadside communication device.

10. The method of claim 5 wherein the on-board navigation device communicates to the application data server which expected roadside communication devices will be used and the estimated time of arrival of the vehicle at each expected roadside communication device, and wherein the on-board navigation device requests the application data server to schedule data transfers to the roadside communications devices at programmed timed intervals.

11. The method of claim 1 wherein a respective amount of data in a respective sub-unit of data is determined by the following formula:

$$S_i = (R_i D_i / V_i)$$

where $S_i$ is a size of data for a respective sub-unit, $R_i$ a wireless link data rate, $D_i$ is a coverage length for a respective roadside communication device along the navigation route, and $V_i$ is the average vehicle speed within the respective coverage length.

12. The method of claim 1 wherein the time period for transmitting a respective sub-unit of data while within the transmitting range is determined in response to a true vehicle speed.

13. The method of claim 1 wherein the time period for transmitting a respective sub-unit of data while within the transmitting range is determined in response to a dynamic traffic congestion information.

14. The method of claim 1 wherein the time period for transmitting a respective sub-unit of data while within the transmitting range is determined in response to traffic signal information.

15. The method of claim 1 wherein the time period for transmitting a respective sub-unit of data while within the transmitting range is determined in response to vehicle position.

16. A vehicle communication system for transferring a data message between a vehicle and an infrastructure communication network, the system comprising:
   a navigation device for determining a navigation route the vehicle is traversing;
   a plurality of expected roadside communication devices for relaying the data message to the vehicle traveling along a navigation route; and
   an application data server for controlling data message transmitted by the roadside communication devices;
   wherein the plurality of expected roadside communication devices are identified along the navigation route, wherein a respective time period that the vehicle will be within a transmitting range of each respective roadside communication device along the navigation route is estimated; wherein the data message is segregated into sub-units of data, each sub-unit of data to be relayed between a respective roadside communication device and the vehicle, and wherein a quantity of data contained in a respective sub-unit is based on an amount of data that may be communicated between the vehicle and the respective roadside communication device during the respective time period that the vehicle is within the transmitting range of the respective roadside communication device.

17. The system of claim 16 wherein the navigation device is an on-board vehicle navigation device.

18. The system of claim 17 wherein the on-board navigation device determines the navigation route and communicates to the application data server which expected roadside communication devices will be used and the estimated time of arrival of the vehicle at each expected roadside communication device, and wherein the on-board navigation device requests the application data server to schedule data transfers to the roadside communications devices at programmed timed intervals.

19. The system of claim 16 wherein the navigation device is an off-board vehicle navigation device.

20. The system of claim 16 wherein the application data server receives the vehicle navigation route and determines which expected roadside communication devices disposed along the navigation route will be used to transmit the segregated data message.

* * * * *